(12) United States Patent
Bastaldo-Tsampalis et al.

(10) Patent No.: US 9,678,690 B2
(45) Date of Patent: Jun. 13, 2017

(54) BIG DATA ALGORITHM AND PLATFORM SOLUTION FOR 3D VISUALIZATION SERVICES

(71) Applicant: Verizon Patent and Licensing Inc., Basking Ridge, NJ (US)

(72) Inventors: Brigitte Bastaldo-Tsampalis, Bridgewater, NJ (US); Yuk L. Li, Morganville, NJ (US); Ashfaq Kamal, White Plains, NY (US); Praveen Venkataramu, Bridgewater, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 397 days.

(21) Appl. No.: 14/340,017

(22) Filed: Jul. 24, 2014

(65) Prior Publication Data
US 2016/0026418 A1  Jan. 28, 2016

(51) Int. Cl.
*G06F 19/00* (2011.01)
*G06F 3/12* (2006.01)
*G06F 17/30* (2006.01)

(52) U.S. Cl.
CPC .......... *G06F 3/1206* (2013.01); *G06F 3/1247* (2013.01); *G06F 3/1288* (2013.01); *G06F 17/30* (2013.01)

(58) Field of Classification Search
CPC .............................. G06F 3/1247; G06F 3/1288
See application file for complete search history.

(56) References Cited

U.S. PATENT DOCUMENTS

| | | | |
|---|---|---|---|
| 9,117,039 B1* | 8/2015 | Mosterman | G06F 17/5009 |
| 9,245,068 B1* | 1/2016 | Mosterman | G06F 17/5018 |
| 2010/0194778 A1* | 8/2010 | Robertson | G06T 13/00 345/619 |
| 2015/0269679 A1* | 9/2015 | Padilla | G06Q 40/06 705/36 R |
| 2016/0026418 A1* | 1/2016 | Bastaldo-Tsampalis | G06F 3/1206 358/1.15 |

OTHER PUBLICATIONS

Friendly, Michael, and Daniel J. Denis. "Milestones in the history of thematic cartography, statistical graphics, and data visualization." URL http://www.datavis.ca/milestones (2001).*
Callieri, Marco, et al. "Visualization and 3D data processing in the David restoration." IEEE computer graphics and applications 24.2 (2004): 16-21.*
Arayici, Yusuf. "An approach for real world data modelling with the 3D terrestrial laser scanner for built environment." Automation in Construction 16.6 (2007): 816-829.*

* cited by examiner

*Primary Examiner* — Michael D Masinick

(57) ABSTRACT

A method for generating a 3D object for visualizing multivariate data includes gathering subscriber information about subscribers of a network, receiving a user request to generate the 3D object, and generating object-data specifying a three-dimensional contour that models a relationship between at least two variables of the subscriber information and a measure. The three-dimensional contour is based on the received request and on the subscriber information, and the object data is generated in a format that is printable by a 3D printer. The object data is transmitted to the user.

20 Claims, 8 Drawing Sheets

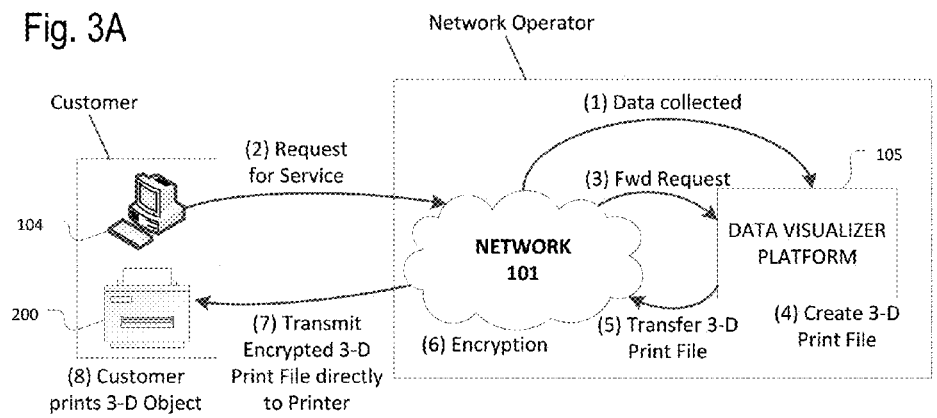
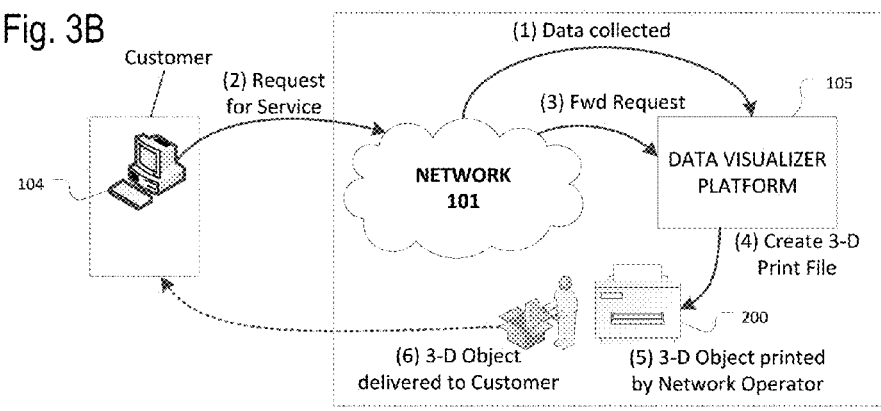
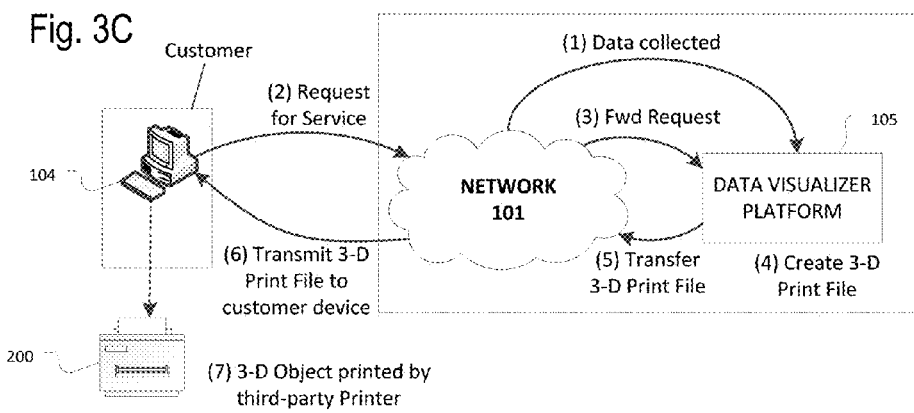

BIG DATA ALGORITHM AND PLATFORM SOLUTION FOR 3D VISUALIZATION SERVICES

BACKGROUND

"Big Data" is a collection of data sets so large and complex that it becomes difficult to process using on-hand database management tools or traditional data processing applications. Useful information may be derived from the analysis of such big data sets. For example, correlations between variables may be discovered and trends may be identified. Such information derivable from a big data set may be of interest to a diversity of people/organizations, including business concerns, law enforcement agencies, disease prevention agencies, administrative agencies, and so on. However, most of those interested in such information do not have access to such a big data set, much less the physical processing capacity or the data processing tools that would be required to appropriately analyze such big data sets.

In addition, even if someone does have access to a big data set and the ability to process the data, it may still be difficult for them to adequately obtain useful information from the big data set. Generally, for information to be useful to a consumer thereof, the consumer must be able to understand the information as having some meaning that is consequential to one or more of the consumer's objectives. However, the relevant meanings of information are not always immediately apparent, and this is increasingly so as the amount of data involved increases.

The manner in which information is presented may affect whether or not (or how easily) someone can understand the relevant meanings of the information. One useful aid to understanding information is to present the information in a visual form. For example, information is commonly conveyed visually in charts or graphs. When information is presented in such a visual form its meanings are more easily grasped by consumers thereof. For example, it may be easier to see trends, correlations, causal interactions, etc. when information can be visualized by the consumer thereof.

However, when the information to be presented is complex—for example, including multiple variables—charts, graphs, and the like are unable to adequately convey the meanings of the information. In particular, it is difficult to present complex multivariate information in a form that allows the consumer thereof to adequately visualize the information. Charts, graphs, and the like generally can only convey relevant information about two variables at a time, due to their two-dimensional ("2D") nature. Moreover, even graphs and charts that attempt to model three variables using pseudo-3D perspective images fail to adequately convey complex relationships involving three or more variables, since relevant information is always lost in the rendering of the pseudo-3D image. Since a big data set usually includes numerous variables (possibly hundreds or more) and a multiplicity of data points (possibly millions), information derivable from such a big data set is usually complex and not adequately conveyed by traditional means of visualization (e.g., charts, graphs, etc.).

Accordingly, the present disclosure provides, in part, systems, programs, and methods that allow for visualizing complex information derived from big data sets.

In addition, those persons who may be interested in the information derivable from a big data set may not have ready access to such data, much less the computing power and data processing tools that would be necessary to analyze such a big data set. Furthermore, even if those persons interested in the information could obtain the information, they probably do not have access to means for creating objects that would allow for visualizing such complex information. Without such visualization, they may not be able to fully appreciate the relevant meanings of the information. Accordingly, the present disclosure also provides, in part, systems, programs, and methods that allow an owner of a big data set to provide a service to customers that includes providing means for the customers to obtain an object that embodies complex information derived from a big data set in such a way that the customer can adequately visualize the information.

BRIEF DESCRIPTION OF THE DRAWINGS

FIGS. 3A-C illustrate exemplary configurations of the system in which the customer is a subscriber to the network and process flows associated therewith.

DETAILED DESCRIPTION

The present disclosure is directed in part toward providing systems, programs, and methods that allow for visualizing complex information derived from big data sets and that allow an owner of a big data set to provide a service to customers that includes providing means for the customers to obtain objects that allow the customer to visualize complex information derived from the big data set.

For example, the present disclosure provides systems, programs, and methods for obtaining multivariate information from big data sets and creating 3D objects that embody the information via 3D printing. 3D printing involves making a three-dimensional ("3D") object of virtually any shape from a digital model. 3D printing generally is accomplished by means of an additive process in which numerous thin layers of material in different shapes are successively deposited one-on-top-of-the-other. Many methods of 3D printing exist, including, for example, fused deposition modeling, selective laser sintering/melting, electron beam melting, printing a binder onto a powder layer, lamination, photopolymerization, and stereolithography.

Such 3D objects that embody information derived from a big data set may allow for visualization of complex information that other methods of visualization, such as charts and graphs, simply cannot match.

Moreover, a service may be offered to customers of a network that allows the customers to obtain from the network operator such a 3D object (or a 3D print file from which such an object can be printed). The 3D object or print file may embody information derived from data collected by the network operator, for example from subscribers of the network. This service may allow customers to obtain information they otherwise would not be able to obtain, and moreover to have this information presented in a visualizable form that they otherwise would not be able to have it presented in. As noted above, most persons do not have access to a big data set, whereas a network operator may have access to a large amount of data. In addition, most persons simply do not have the appropriate technology, much less the raw processing capacity, required to analyze such data, derive information therefrom, and convert that information into a file that can be printed by a 3D printer.

Figure 1:
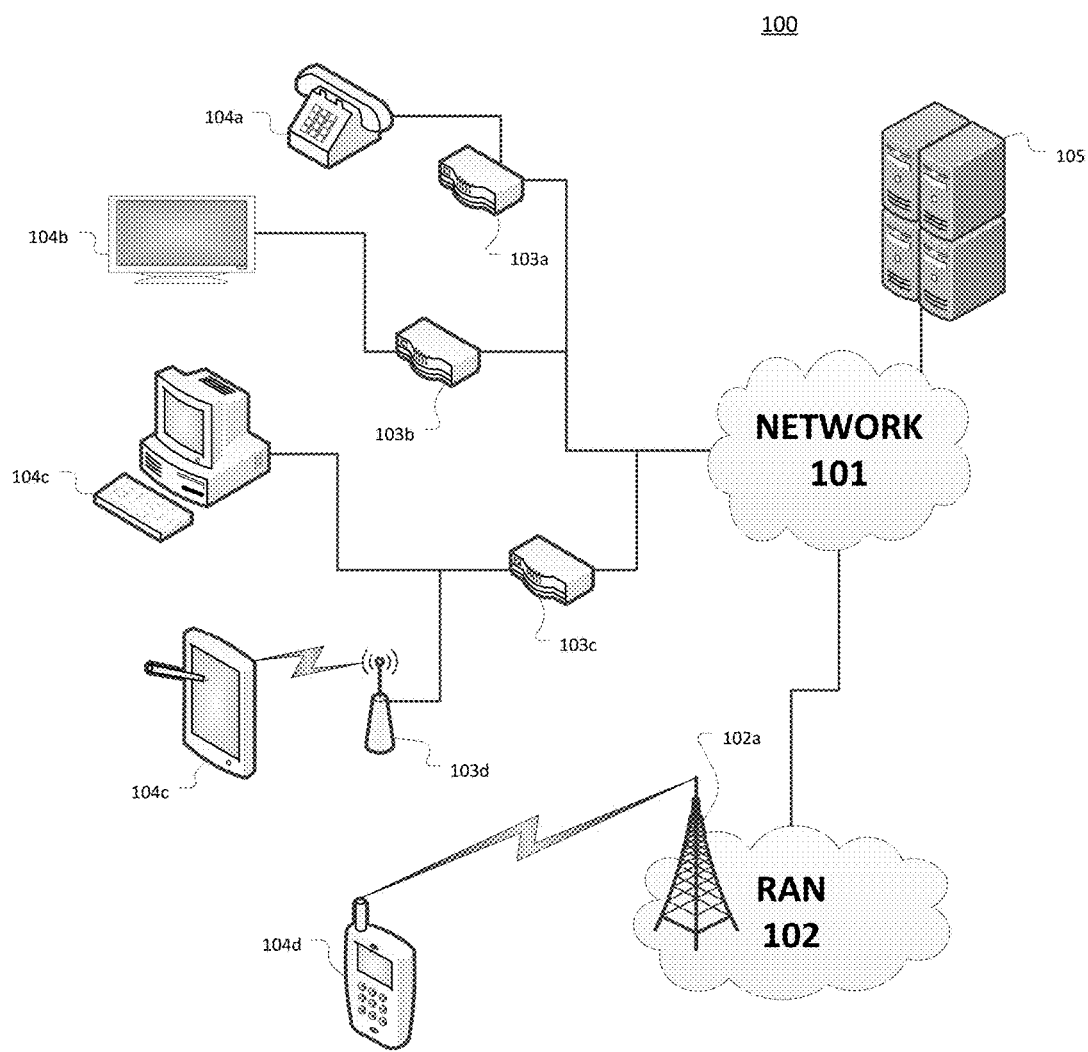
FIG. 1 illustrates an exemplary system.

FIG. 1 illustrates an exemplary system 100. The system 100 includes a network 101, a Radio Access Network (RAN) 102, access devices 103, subscriber devices 104, and a data visualizer platform 105. The network 101 is a telecommunications core network that may include one or more sub-networks that are operated by the same network operator, each sub-network providing various services to subscribers. The services provided by the network 101 may include, for example, telephone services, cable television services, internet services, and cellular telephone services. Thus, the network 101 may include circuit-switched sub-networks (e.g., telephone system) and packet-switched sub-networks (e.g., Internet Service Provider (ISP) core network). The network 101 may be a core network that facilitates transfer of data between connected user devices 104 and various external networks 401, such as the internet, the public switched telephone network, etc.

The network 101 may provide digital and/or analog telephone services to user devices 104a. The user devices 104a may connect to the network through access devices 103a, which may be installed in the subscriber's premises. Access device 103a may simply be the familiar telephone wall jack, a modem, a router, or any other device capable of connecting user devices 104a to a telephone network.

The network 101 may also provide digital and/or analog cable television services to user devices 104b. The user devices 104b may connect to the network through access devices 103b, which may be installed in the subscriber's premises. User devices 104b include televisions, DVR systems, media center systems, or any other device capable of processing cable television signals. Access device 103b may be a set-top box, router, satellite dish, or any other device capable of connecting user devices 104b to a cable television network.

The network 101 may also provide internet connection services to user devices 104c. The user devices 104c may connect to the internet through the network 101, and may connect to the network 101 through access devices 103c, which may be installed in the subscriber's premises. User devices 104c include personal computers, tablets, smart phones, or any other device capable of connecting to the internet. Access device 103c may be a router or any other device capable of connecting user devices 104c to an ISP network. The user devices 104c may be connected to the access devices 103c in any convenient fashion, including via wired connection or wireless connections, such as via a wireless access point 103d.

The network 101 may provide the aforementioned telephone, television, and internet services over separate sub-networks, or over the same sub-network. Moreover, a single access device 103 may be capable of providing more than one of the aforementioned services to an individual subscriber. Moreover, the access devices 103 may be connected to the network 101 by various means, including wired connections, fiber optic connections, satellite connections, etc.

The network 101 may also provide cellular connection services (voice, data, etc.) to user devices 104d via the RAN 102. RAN 102 implements a radio access technology that wirelessly connects user devices 104d to the core network 101. Cellular telephones are a familiar example of user devices 104d that may connect to the core network 101 via the RAN 102, but other devices are also capable of connecting to the network 101 through the RAN 102, such as, for example, portable computers, tablets, PDAs, and so on. An exemplary RAN 102 is the U-TRAN of a 4G-LTE network. The RAN 102 may include radio access base stations 102a for establishing the wireless connections, such as, for example, the eNode B nodes of a 4G-LTE network. Data from the RAN 102 is transferred to the core network 101, and from the core network 101 to the appropriate external network, such as the internet, an IP Multimedia Subsystem (IMS), the public switched telephone network, etc.

The network 101 may provide one or more of the above-described services in any combination to subscribers, or additional services not discussed above.

The network 101 is connected to the data visualizer platform 105. The data visualizer platform 105 may collect information about subscribers of the network 101, and may enable the production of 3D objects that embody this information. In particular, the data visualizer platform 105 provides a data visualization service that may include creating 3D printable files based on information about subscribers of the network 101. The system 100 may provide for secure transfer of the 3D printable file to a 3D printer 200 such that a 3D object embodying information about subscribers of the network 101 may be manufactured.

A service provider operating a network such as the network 101 generally has access to large amounts of information concerning their subscribers. For example, the service provider will generally have at least the name and address of each subscriber for billing purposes, and often will have access to other demographic information about the subscribers as well. In addition, the service provider will generally know what type of user equipment 104 the subscriber is using (e.g., what brand and model of cell phone), as well as various types of information about the subscriber's usage of the services being provided by the network 101. For example, the service provider may know information regarding the amount of usage of a particular service, the frequency of usage of a particular service, the terminus of a particular communication session (e.g., the phone number that was called, the website that was visited, the channel that was watched), the duration of a particular communication session, etc. Moreover, the service provider may be able to actively obtain additional information about the subscribers by various means, such as though providing surveys to their subscribers, by purchasing information from third-parties, etc. In addition, the service provider is often able to infer information about the subscriber from information already at hand. For example, from the address of the subscriber the service provider may be able to infer a rough estimate of the income of the subscriber by considering the average income of the zip code in which the subscriber resides. Regardless of the specific source of the information, the data visualizer platform 105 may collect, store, and organize the information for later use in producing the 3D objects. Hereinafter, the information stored by the data visualizer platform 105 will simply be referred to as "subscriber information" for simplicity.

Figure 2:
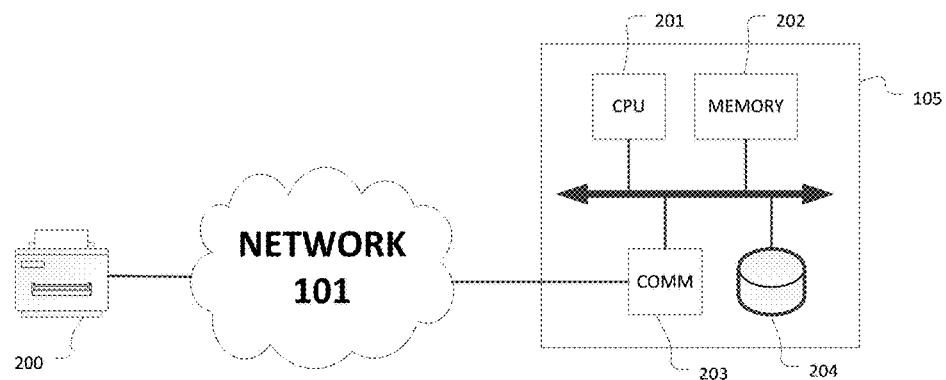
FIG. 2 illustrates an exemplary data visualization platform.

FIG. 2 illustrates exemplary components of the data visualizer platform 105, including a CPU 201, a memory 202, a communications unit 203, and a data store 204. In FIG. 2, the network 101 is connected to the data visualizer platform 105 and to a 3D printer 200. The CPU 201 may be one or more general or special-purpose processors. The memory 202 may be one or more memory devices that store computer code that, when executed by the CPU 201, causes the data visualizer platform 105 to perform the various functions described herein. The communications unit 203 connects the data visualizer platform 105 to the network 101. The data store 204 may be one or more computer storage devices that store the subscriber information. The data store 204 and the memory 202 may be part of the same physical device or different physical devices. Moreover, although the data visualizer platform 105 is shown in the Figures for ease of illustration as if it were implemented using a single computing device, it will be understood that the data visualizer platform 105 could be implemented distributively across multiple physically distinct computing devices.

The 3D printer 200 may be any 3D printer capable of manufacturing 3D objects based on a digital model. Various 3D printers are currently commercially available. In certain exemplary illustrations, the 3D printer 200 may be configured to connect to the network 101, which may enable the printer 200 to communicate with the data visualizer platform 105 over the network 101 without having to access an external network (such as the internet). This may be accomplished, for example, by connecting the 3D printer 200 to an access device 103 (such as a router) that is connected to the network 101. The printer 200 may alternatively be equipped with hardware and/or software that allows the printer 200 to connect to the network 101 without an access device 103. For example, the printer 200 may be equipped with routing hardware and/or software that performs some of the functions of a router or set-top box.

Configuring the printer 200 to connect to the network 101 may further include changing settings of the printer 200, the access device 103, and/or the network 101 in a manner similar to that used when configuring any other subscriber device 104 to connect to the network 101 (e.g., assigning/updating IP addresses, updating MAC address lists, updating firewall permissions, changing communication protocol settings, etc.). Configuring the printer 200 to connect to the network 101 may also include the installation of computer programs (e.g., firmware, device drivers, data-visualization-service user interface, etc.) in the printer 200.

The printer 200 may also be configured such that it and only it may open 3D print files delivered thereto by the network 101. Any encryption scheme that achieves this result may be used. For example, a symmetric key encryption scheme may be used in which the network 101 operator and the printer 200 have matching private keys, and the 3D print file is encrypted by the network 101 operator prior to transmission to the printer 200 using the private key. In such a case, only someone having the matching private key could decrypt the 3D print file, and thus if the printer 200 is the only entity with the matching private key, then only the printer 200 could decrypt the file. As another example, an asymmetric encryption scheme could be implemented in which the printer 200 has a public key and a private key, and the network 101 operator encrypts the data using the printer 200's public key. In such a case, if the printer 200 remains the only holder of the private key, then only the printer 200 can decrypt the file. An example of a symmetric encryption system is Advanced Encryption Standard ("AES"). An example of an asymmetric encryption system is RSA. Obviously, no encryption scheme is invulnerable. For example, if a private key is compromised (e.g., the printer 200 is hacked and the key stolen), then the encryption will not be secure. Moreover, it is well understood that any encryption scheme could theoretically be cracked by brute-force guessing, given sufficient computing power and time. Thus, an encryption scheme may be considered "secure" if the computational requirements of breaking the encrypted text are infeasible for an attacker. The difficulty of breaking an encryption is commonly measured in "bits." For purposes of this application, the encryption is considered "secure" if it provides at least 80 bits of protection. Merely as an example, AES generally provides between 100 and 250 bits of security, depending upon key length. Accordingly, references herein and in the appended claims to the 3D print file being accessible "only" to the printer 200 assume a context of ordinary usage. That is, these references to "only" the printer 200 being able to open the file do not exclude the possibility of the file being opened by third-parties in extraordinary circumstances, such as through illicit compromise of the private key or brute force decryption attacks.

Moreover, in certain exemplary illustrations, the 3D printer 200 may be provisioned by the network operator of the network 101, in a manner analogous to the network 101 operator provisioning access devices 103.

As an alternative to the printer 200 being configured such that it and only it may open the 3D print file, the printer 200 may be configured such that only it and a select group of other devices may open the 3D print files delivered thereto. For example, encryption similar to that discussed in the example above may be used, but multiple devices may share the same key. In such a case, those devices sharing the same key could all open files intended for any of the other devices, but devices that do not have the key could not. As an example, the network operator of the network 101 may provide all (or a subset) of the printers 200 that are provisioned to customers by the network operator with the same key, such that any printer 200 provisioned by the network operator can open the 3D print file and any device not provisioned by the network operator cannot open the 3D print file.

Figure 4A:
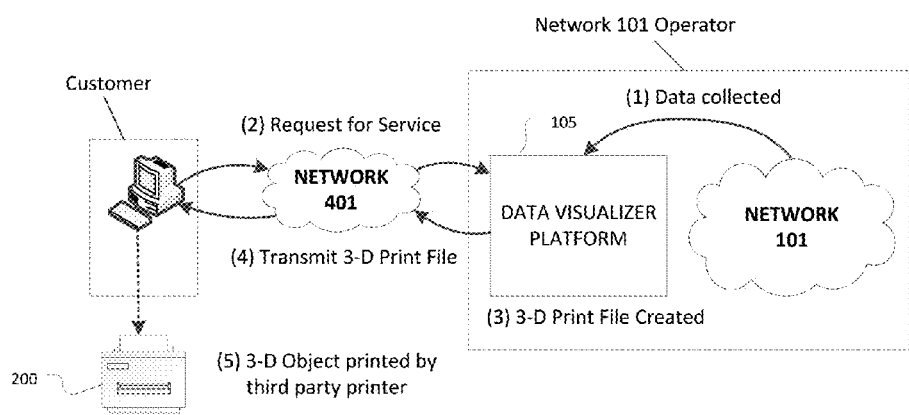
FIGS. 4A-B illustrate exemplary configurations of the system in which the customer is not necessarily a subscriber to the network and process flows associated therewith.
Figure 4B:
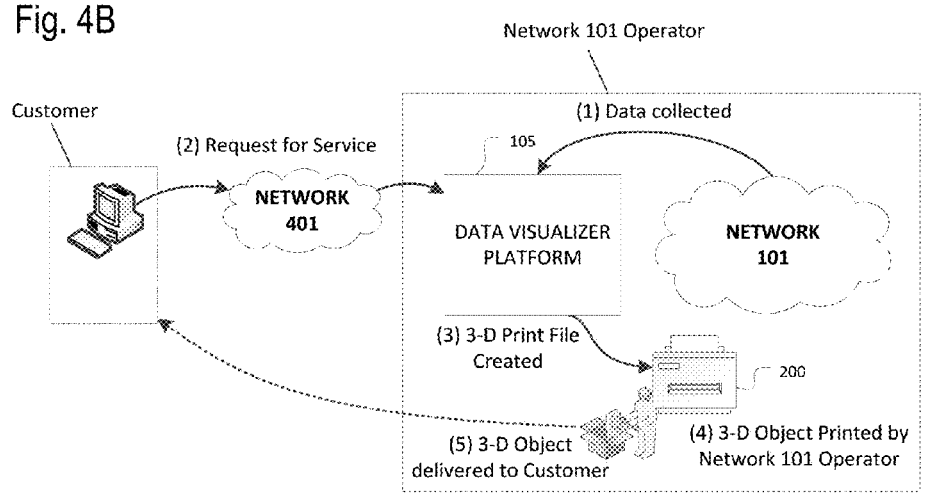

Various examples of how the data visualization service may be provided are shown in FIGS. 3A-4B. In FIGS. 3A-3C, configurations are shown in which the customer of the data visualization service is also a subscriber of the network 101. In FIGS. 4A and 4B, configurations are shown in which the customer of the data visualization service need not be a subscriber of the network 101.

For example, in FIG. 3A, a configuration is illustrated in which the 3D printer 200 connects to the network 101. In particular, in the example of FIG. 3A the 3D printer 200 may be specially configured to communicate securely with the data visualizer platform 105 over the network 101 without having to access an external network (such as the internet). The 3D printer 200 may connect to the network 101 via an access device 103 (for example, a set-top box or router provided by the network operator), or the printer 200 may itself have the necessary routing functions (software and/or hardware) built-in such that it may act as its own access device 103 in connecting to the network 101. A subscriber of the network 101 may purchase or lease the 3D printer 200 from the network 101 operator, and the configured 3D printer 200 may be provisioned to the subscriber by the network 101 operator. Alternatively, the customer may provide his/her own 3D printer and have it subsequently configured as described above, for example by downloading appropriate software and/or purchasing/leasing the appropriate access device 103.

The data visualization service illustrated in FIG. 3A will now be described. In step (1) information regarding subscribers of the network 101 is collected by the operator of the network 101. Then, in steps (2) and (3) a customer of the data visualization service may send a request for service to the data visualizer platform 105 via the network 101. In this example, the customer of the data visualization service is also a subscriber of the network 101, and thus the request may be sent securely via the network 101 without having to access an external network. For example, the request may be sent from a subscriber device 104 connected to the network 101, or may be sent from the printer 200 connected to the network 101. In step (4) the data visualizer platform 105 creates a 3D print file based on the request and on the subscriber data. The creation of the 3D print file will be discussed in greater detail below. In steps (5) and (7) the 3D print file is transferred to the printer 200 via the network 101. Further, in step (6) the 3D print file may be encrypted to increase the security of the transfer. Moreover, in addition to standard network transmission encryption methods, the 3D print file may be encrypted in such a way that only the printer 200 of the customer may decrypt the file, further increasing the security of the transfer. In the example of FIG. 3A, the 3D print file is transferred directly to the printer 200 through the network 101, rather than being, for example, delivered to a subscriber device 104 of the customer. Transmitting the file directly to the printer may make it more difficult for the customer to copy or transfer the file to third parties, which may be advantageous to the network 101 operator in certain circumstances. In step (8) the customer prints a 3D object based on the 3D print file using the printer 200.

In FIG. 3B, a configuration is illustrated in which the network operator controls the 3D printer 200 rather than the customer. Steps (1) through (4) are similar to those in FIG. 3A, and thus description thereof will be omitted. In this example, the customer of the data visualization service is also a subscriber of the network 101, and thus the request may be sent securely via the network 101 without having to access an external network. For example, the request may be sent from a subscriber device 104 connected to the network 101. In step (5), the network 101 operator prints a 3D object based on the 3D print file created in step (4). In step (6), the 3D object is physically delivered to the customer. By avoiding transferring the 3D print file to the customer, security may be increased and copying/transfer of the 3D print file is prevented, which may be advantageous to the network 101 operator in certain circumstances. Moreover, the configuration of FIG. 3B allows customers who do not have access to a 3D printer 200 to nonetheless use the data visualization service.

In FIG. 3C, a configuration is illustrated in which the 3D printer 200 is not specifically configured to communicate with the data visualizer platform 105 via the network 101. For example, the printer 200 may be owned by a third party (e.g., a business that offers 3D printing services), or the printer 200 may be owned by the customer but without having been specially configured to connect to the network 101 (e.g., the printer 200 is an off-the-shelf product). Steps (1) through (4) are similar to those in FIG. 3A, and thus description thereof will be omitted. In this example, the customer of the data visualization service is also a subscriber of the network 101, and thus the request may be sent securely via the network 101 without having to access an external network. For example, the request may be sent from a subscriber device 104 connected to the network 101. In steps (5) and (6) the 3D print file is transferred to the customer via the network 101. Although not illustrated, the 3D print file may be encrypted using standard network encryption methods. However, unlike in FIG. 3A, the 3D print file cannot be encrypted such that only a specific printer 200 may open the file, since in the example of FIG. 3C the printer 200 is essentially unknown to the network 101. Thus, the 3D print file may be transferred to the customer in a format that the customer can, for example, take to a third-party for printing or print using a printer 200 not specifically configured to connect to the network 101. In step (7) the 3D object is printed by the printer 200. In this example, the format of the file may provide the customer with increased flexibility in how to print the 3D object, which may be advantageous to the network 101 operator in certain circumstances. However, the format of the file may also result in the network 101 operator having decreased control over copying/transfer of the 3D print file.

In FIG. 4A, a configuration is illustrated in which the customer of the data visualization service need not also be a subscriber of the network 101. Moreover, in this example the 3D printer 200 is not specifically configured to communicate with the data visualizer platform 105 via the network 101. In step (1) information regarding subscribers of the network 101 is collected by the operator of the network 101. Then, in step (2) a customer of the data visualization service may send a request for service to the data visualizer platform 105. However, unlike in FIGS. 3A-C in which the request was sent via the network 101, in this example the request is sent via an external network 401, such as the internet. For example, the operator of the network 101 may maintain a website for the data visualizer platform, and people may sent requests to the website via the internet regardless of whether or not they are subscribers to the network 101. This may allow for a broadening of the customer base that may use the data visualization service, which may be advantageous to the network 101 operator in certain circumstances. However, this also may reduce security, since the requests and file transfers are no long maintained "in-network". In step (3) the 3D print file is created, and in step (4) the 3D print file is transferred to the customer via the external network 401. In step (5) the 3D object is printed by the customer or a third party using a printer 200. Unlike in FIG. 3A, the 3D print file cannot be encrypted such that only a specific printer 200 may open the file, since in the example of FIG. 4A the printer 200 is essentially unknown to the network 101. Thus, the 3D print file may be transferred to the customer in a format that the customer can, for example, take to a third-party for printing or print using a printer 200 not specifically configured to connect to the network 101.

In FIG. 4B, a configuration similar to that of FIG. 3B is illustrated except that in FIG. 4B the customer of the data visualization service need not also be a subscriber of the network 101. Thus, in FIG. 4B, the request for service is sent to the data visualizer platform 105 via an external network 401, as discussed with respect to FIG. 4A. In steps (3) through (5) the network 101 operator creates the 3D print file, prints the 3D object, and physically delivers the 3D object to the customer. This configuration allows for a broadening of the customer base while increasing security and maintaining control over the copying/transfer of the 3D print file.

It will be understood that the configurations and process flows of FIGS. 3A-4B are merely exemplary, and that modifications, substitutions, additions, subtractions, and so on can be made to the configurations.

It will also be understood that the "operator of the network 101" in the examples of FIGS. 3A-4B may be any entity controlled by or working in conjunction with the actual operator of the network 101. Thus, for example, a third-party who is licensed by the operator of the network 101 to print the 3D print files may be considered as the operator of the network 101 with respect to FIGS. 3A-4B.

Figure 5:
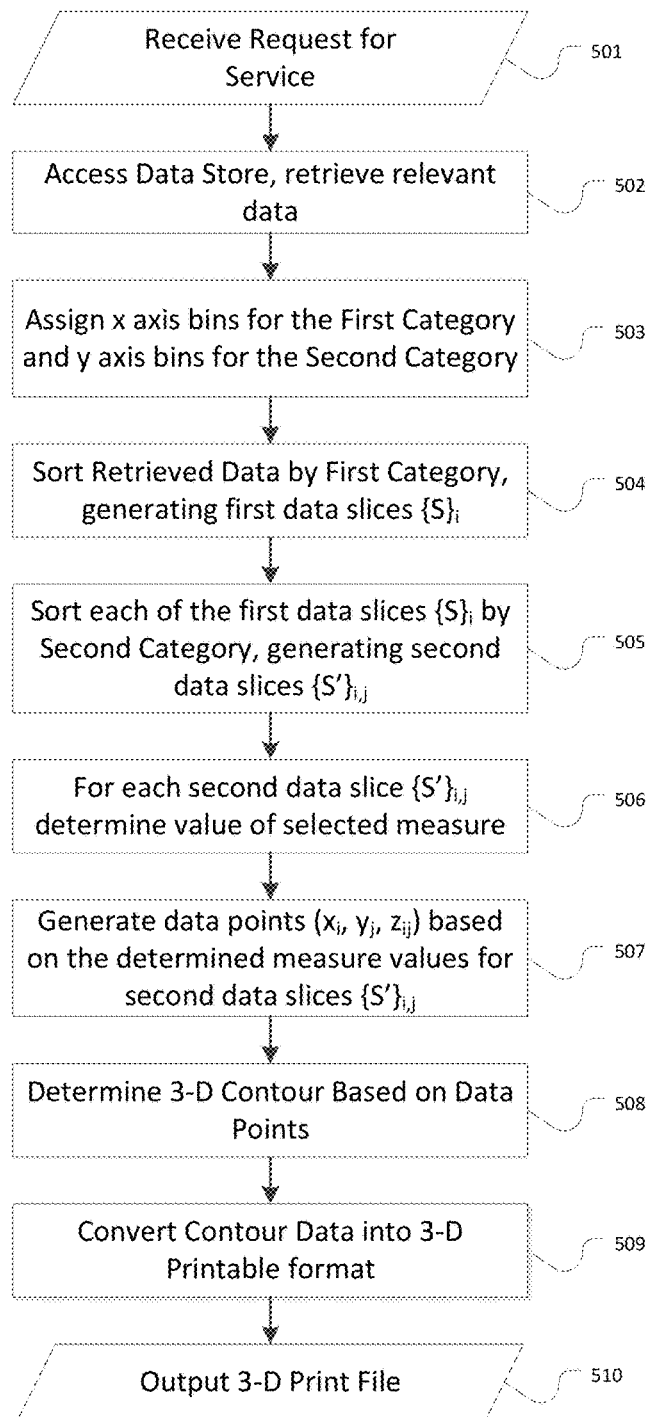
FIG. 5 illustrates an exemplary process flow.

FIG. 5 illustrates an exemplary process flow whereby the data visualizer platform 105 may create the 3D print file based on the customer request and on the subscriber data. The 3D print file comprises a digital model of a 3D object that can be printed by the 3D printer 200. The 3D print file is based on the subscriber data that the data visualizer platform 105 gathers, stores, and sorts. The 3D object printed from the 3D print file allows for the visualization of the relationships between multivariate data.

Figure 7:
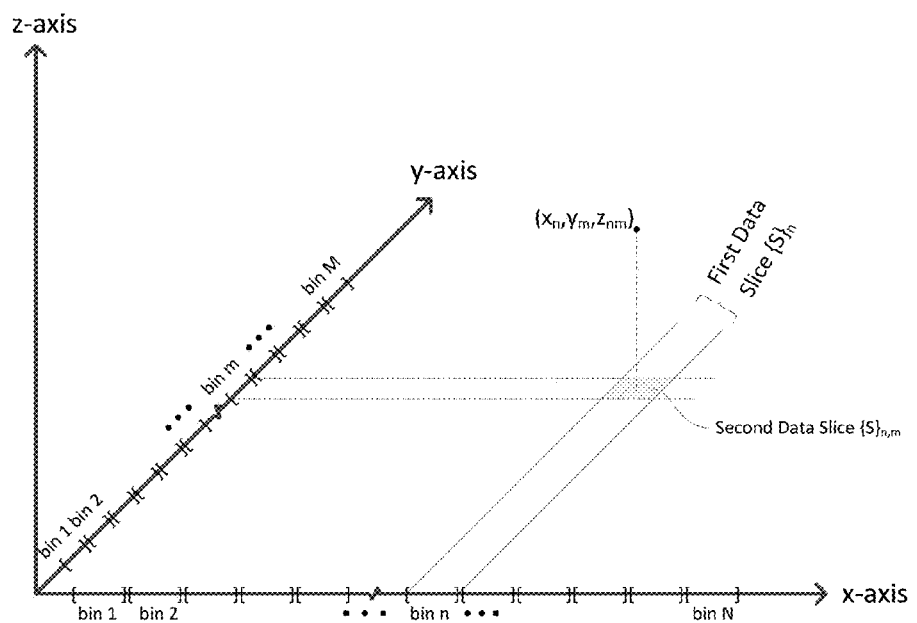
FIG. 7 is a conceptual diagram illustrating exemplary axis and bins.

In the description below, a Cartesian coordinate system, such as the one illustrated in FIG. 7, is assumed merely for ease of discussion. Thus, an x-axis, a y-axis, and a z-axis are referred to, as are data points having the form (x,y,z). It will be understood that this convention is used merely for convenience, and that other conventions could be implemented by the data visualizer platform 105 in actual practice.

In step 501, the customer request is received. The customer request may include designations of a first category, a second category, and a measure. The first and second categories correspond to independent variables, and the measure corresponds to a dependent variable. The request may also include specific constraints, such as time period or geographical area constraints, maximum or minimum value constraints, etc. As discussed in greater detail below, a user interface may be provided that facilitates the customer's selections. If no constraints are designated, default constraints may be applied. For example, default constraints may include limiting data to a certain time period (e.g., the last 5 years) and to a certain region (e.g., the state in which the customer resides).

The first and second categories may be any type of variable or dimension that is included in the subscriber data. For example, the subscriber data may include subscriber gender information, subscriber age information, subscriber income information, subscriber location information, subscriber race information, subscriber device 104 brand information, subscriber device 104 model information, subscriber device 104 operating system (OS) information, information regarding the subscriber's usage of certain network 101 services (e.g., whether particular advertisements were watched/clicked), etc.

The measure is the value the customer is interested in modeling against the first and second categories. The measure may be any type of variable or dimension that is included in the subscriber data. Moreover, the measure may be any other values derivable from the subscriber data, such as an average, a density, a sum, a rate of change, etc.

For example, consider the case in which the request designates age and income as the first and second categories, and density of subscribers as the measure, and a particular location as a constraint. In such a case, the customer is requesting a 3D object that models how age and income are related to the density of subscribers in that particular location. As another example, consider the case in which the request designates age and time as the first and second categories, and total number of users of a particular OS as the measure. In such a case the customer is requesting a 3D object that models how age relates to usage of the designated OS, and how this relationship has changed with time. The number of distinct combinations of categories, measures, and constraints that can be selected is large, especially if the number of types of data that are included in the subscriber data is large. Generally, any combination of selections can be allowed, but it may be preferable to require that the selected measure be causally relatable to the first and second categories.

The data visualizer platform 105 excels at modeling densities, which heretofore have been difficult to visualize. A density is an amount of something per a given unit. Some densities are familiar, such as an amount of mass per unit of volume or an amount of persons per unit area. However, the data visualizer platform 105 expands the range of the types of densities that may be modeled and visualized. The data visualizer platform 105 may model a density of almost any type of variable included in the subscriber data as a function of two other variables included in the subscriber data. For example, a density of subscribers in a given region as a function of age and income.

In step 502, the data visualizer platform 105 may access the data store 204 and retrieve data relevant to the request. Each instance of the subscriber data corresponds to a particular subscriber and a particular time (e.g., the time the data was collected), and provides information about a particular variable. For ease of discussion, the entire set of data points that corresponds to a particular subscriber and a particular time will be referred to collectively as an "entry." For example, suppose for simplicity that the subscriber data includes only age, gender, and OS variables. In such an example, each "entry" would contain three instances of data: one for the age of the corresponding subscriber, one for the gender of the corresponding subscriber, and one for the OS used by the corresponding subscriber. The relevant data that the data visualizer platform 105 retrieves may include each entry that has a value for at least one of the selected first and second categories and that satisfies the selected constraints. For example, if the request designates age and income as the first and second categories and a geographical location as a constraint, then the relevant data includes those entries having at least an age or income value and that have a location value satisfying the constraint.

In step 503, the data visualizer platform 105 may assign x-axis bins for the first category and y-axis bins for the second category. A bin is a designated range of the axis, and assigning bins includes determining a number of bins to assign and also the particular ranges for the bins along the corresponding axis. It may be advantageous in some circumstances for the ranges of those bins that share the same axis to be roughly equal in size. The determination of the number and sizes of the bins will depend upon the type of category selected, the range of data values occurring in that category, and the granularity of the data values. The customer may be able to include in the request a designation of the number and size of bins preferred, or the data visualizer platform 105 may apply predetermined rules corresponding to the selected categories. The predetermined rules may, for example, be designed to ensure that all of the relevant data is represented and to minimize "empty" bins. Note that for some categories the bin size may be arbitrarily selected since the bins in the finished 3D object will have no numerical signification. For example, if the OS of the subscriber device 104 is one of the selected categories, then the bins selected for this category could each correspond to a particular OS (e.g., one bin for iOS, one bin for Android, one bin for Windows, etc.), and the width of the bins would not have a numerical significance in the ultimate product; in such a case, the bin width may be selected such that the bins are visibly distinguishable from each other. For some types of variables, especially roughly continuous variables with fairly fine-grained bins, it may be advantageous for the bins to be contiguously disposed along their respective axis. For other types of variables, especially non-numerical variables, it may be advantageous for the bins to have spaces therebetween such that each bin can be visually distinguished from its neighbors in the ultimate product. For purposes of discussion herein, the x-axis bins will be indexed by the index i=1, 2, . . . N, and the y-axis bins will be indexed by the index j=1, 2, . . . M. A conceptual illustration of exemplary x-axis and y-axis bins is found in FIG. 7.

In step 504, the data visualizer platform 105 may sort the retrieved data on the basis of the first category and in accordance with the determined x-axis bins. This means that the entries of the retrieved data are sorted into groups based on the entries' respective values for the first category, with each group corresponding to one of the bins. The data in each group forms a first data slice $\{S\}_i$, such that the $n^{th}$ first data slice $\{S\}_{i=n}$ corresponds to the $n^{th}$ x-axis bin.

Figure 6:
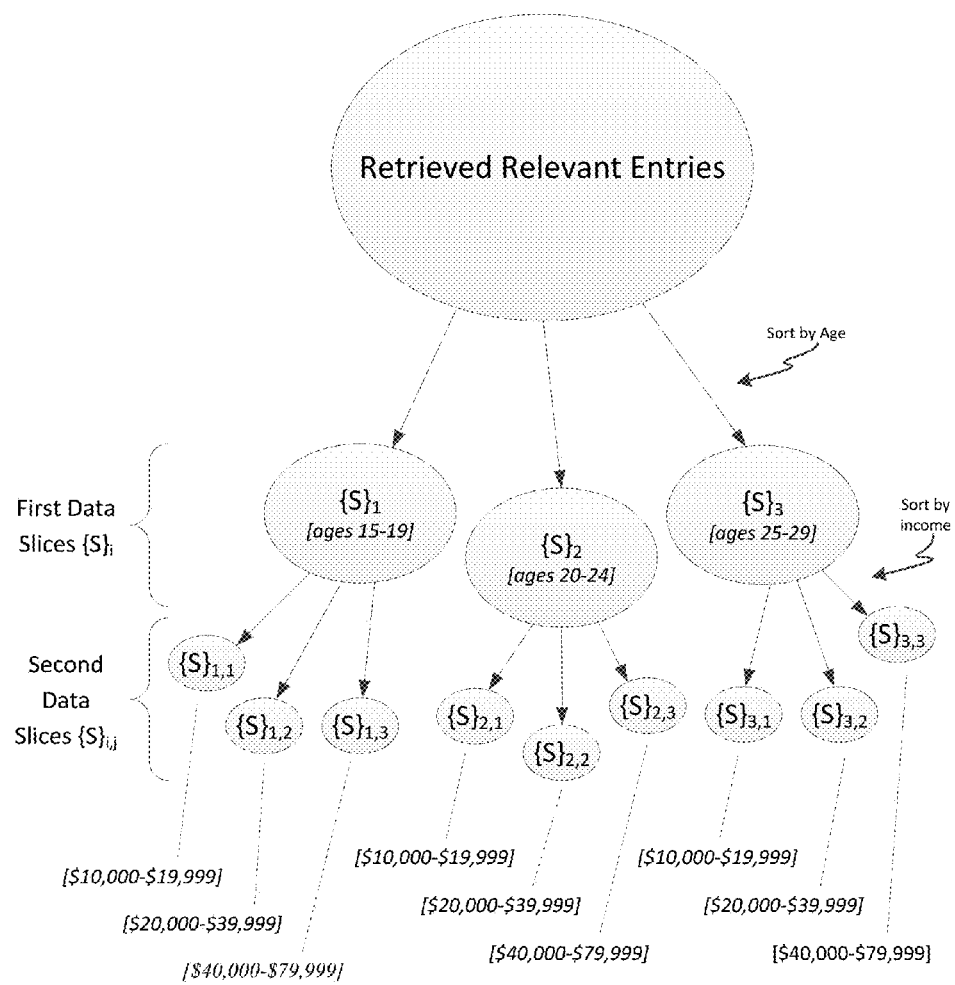
FIG. 6 is a conceptual diagram illustrating exemplary data slices.

A conceptual illustration of how the relevant data is sorted into first data slices $\{S\}_i$ is found in FIG. 6. In the example of FIG. 6, there are three x-axis bins, and thus the relevant entries are sorted into three first data slices: $\{S\}_1$, $\{S\}_2$, and $\{S\}_3$. For example, if the first category is "age," then the entries would be sorted into groups on the basis of the respective values of the "age" variable of the entries. If the x-axis has been assigned the bins $[15\text{-}19]_1$, $[20\text{-}24]_2$, and $[25\text{-}29]_3$, then the sorted data will be grouped into first data slices $\{S\}_i$, where first data slice $\{S\}_1$ includes all the entries having an age variable value between 15 and 19, first data slice $\{S\}_2$ includes all entries having an age variable value between 20 and 24, and first data slice $\{S\}_3$ includes all entries having an age variable value between 25 and 29.

In step 505, the data visualizer platform 105 may sort each of the first data slices $\{S\}_i$ on the basis of the second category and in accordance with the determined y-axis bins. This means that, for each of the first data slices $\{S\}_i$, the entries thereof are sorted into sub-groups based on the entries' respective values for the second category, with each sub-group corresponding to one of the y-axis bins. For each of the first data slices $\{S\}_i$, the data in each sub-group thereof forms a second data slice $\{S\}_{i,j}$.

A conceptual illustration of how the relevant data is sorted into second data slices $\{S\}_{i,j}$ is found in FIG. 6. In the example of FIG. 6, there are three y-axis bins, and thus each of the first data slices $\{S\}_i$ is further sorted into three second data slices: $\{S\}_{i,1}$, $\{S\}_{i,2}$, and $\{S\}_{i,3}$. To continue the above-example, if the second category is "income", then the entries would be sorted into groups on the basis of the respective values of the "income" variable of the entries. Supposing that the y-axis has been assigned the bins $[\$10,000\text{-}\$19,999]_1$, $[\$20,000\text{-}\$39,999]_2$, and $[\$40,000\text{-}\$79,999]_3$, then for each of the first data slices $\{S\}_i$, the entries will be grouped into second data slices $\{S\}_{i,j}$, where second data slice $\{S\}_{1,1}$ includes all the entries having an age variable value between 15 and 19 and an income variable value between \$10,000 and \$19,999, the second data slice $\{S\}_{1,2}$ includes all entries having an age variable value between 15 and 19 and an income variable value between \$20,000 and \$39,999, and so on up to the second data slice $\{S\}_{3,3}$ that includes all the entries having an age variable value between 25 and 29 and an income variable value between \$40,000 and \$79,999.

The relationship between the first and second data slices and the x- and y-axis bins is conceptually illustrated in FIG. 7. As shown in the figure, the first data slice $\{S\}_n$ may be thought of conceptually as all of the data points falling within the range of the $n^{th}$ bin. The second data slice $\{S\}_{n,m}$ may be thought of conceptually as all of the data points falling within that portion of the first data slice $\{S\}_n$ that corresponds to the $m^{th}$ y-axis bin—namely, those data points in the area of intersection between the $m^{th}$ y-axis bin and the $n^{th}$ x-axis bin.

In step 506, the data visualizer platform 105 may determine, for each second data slice $\{S\}_{i,j}$, a value of the selected measure. How the data visualization platform determines the value of the selected measure will depend upon the selected measure itself. For example, if the selected measure is an average of a variable, then the data visualizer platform 105 will compute an average value of that variable from the data included in the corresponding second data slice; if the selected measure is sum of a variable, then the data visualizer platform 105 will compute a sum of the values of that variable from the data included in the corresponding second data slice; and so on.

To continue the above-example, if the selected measure is the density of subscribers who use a particular OS, then the data visualizer platform 105 may determine the value of the selected measure for each second data slice $\{S\}_{i,j}$ by adding up the total number of data entries in the respective second data slice $\{S\}_{i,j}$ for which the subscriber uses the designated OS.

In step 507, the data visualizer platform 105 may generate data points $(x_i, y_j, z_{ij})$, for each value of i and j, based on the x-axis bins, y-axis bins, and the determined measure values. The value of $x_i$ may be any value within the range of the corresponding x-axis bin—for example, the center value of the range. The value of $y_j$ may similarly be any value within the range of the corresponding y-axis bin, such as, for example, the center value of the range. The value of $z_{ij}$ may be the value of the measure determined for the second data slice $\{S\}_{i,j}$.

In the event there is no determined value of the measure for a given second data slice $\{S\}_{i=n,j=m}$ (for example, suppose there were no data entries that fell within the second data slice $\{S\}_{i=n,j=m}$), then the data visualizer platform 105 may take appropriate corrective action. For example, the data visualizer platform 105 may interpolate a value for $z_{nm}$ from its neighboring values. Alternatively, the data visualizer platform 105 may adjust the bin widths such that each second data slice has data entries therein and perform steps 504 through 507 again.

Figure 8A:
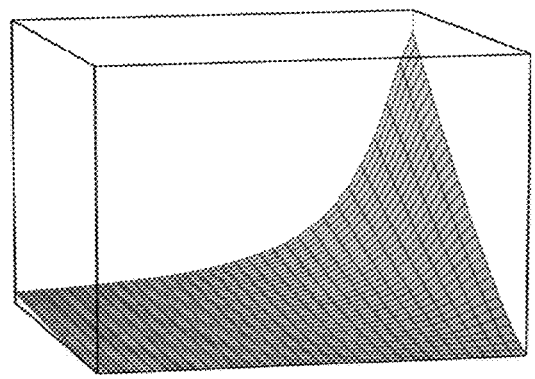
FIGS. 8A-C illustrate exemplary pseudo-3D perspective renderings.
Figure 8B:
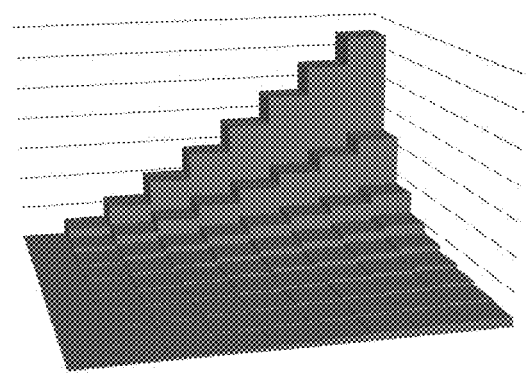
Figure 8C:
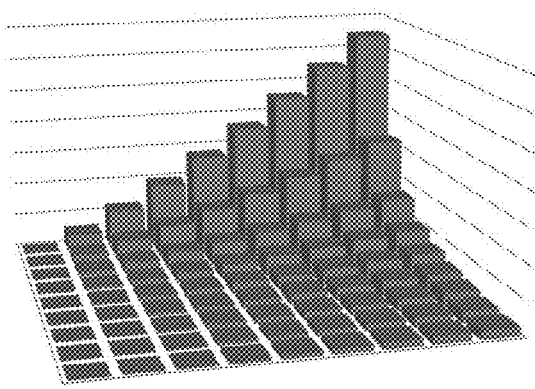

In step 508, the data visualizer platform 105 may determine a contour based on the data points. The determined contour corresponds to the shape of the 3D product that will embody the data points $(x_i, y_j, z_{ij})$. Any shape may be used for the 3D product as long as it approximately corresponds to the data points $(x_i, y_j, z_{ij})$. For example, the contour may smoothly connect each of the data points $(x_i, y_j, z_{ij})$ to its neighboring points, as is shown in the exemplary pseudo-3D perspective rendering of FIG. 8A. As another example, the contour may include "steps" or "bars" for each of the points $(x_i, y_j, z_{ij})$, as is shown in the exemplary pseudo-3D perspective rendering of FIG. 8B. As another example, the contour may include steps or bars as in the previous example, but with separation between the bars, as is shown in the exemplary pseudo-3D perspective rendering of FIG. 8B. Each of the examples of FIGS. 8A-C corresponds to the same set of points $(x_i, y_j, z_{ij})$, but each models those points using slightly differently-shaped contours. Smoothly connected data points may be advantageous for modeling categories with fine-grained bins, and discrete steps may be advantageous for modeling categories with more grossly-grained bins or with arbitrarily selected bins. The contour may also include both smoothly connected data points and discrete steps (e.g., smoothly connected data points in one dimension and discrete steps in another dimensions). For example, suppose the first category is time, the second category is subscriber OS, and the measure is subscriber density. In such an example, the contour may smoothly connect data points in the direction of the x-axis, since time is often a fairly continuous or fine-grained variable. Operating system, on the other hand, includes arbitrarily chosen bins as discussed above, and thus the contour might use discrete steps with gaps therebetween in the y-axis direction such that each bin is clearly discernible from the other.

In addition to the contour being shaped so as to correspond to the data points ($x_i$, $y_j$, $z_{ij}$), the contour may also be shaped so as to include additional visible features, for example, axis labels, data point labels, gridlines, contour lines, etc. In some circumstances it might be preferable for axis labels and certain other visible features to be provided in a peripheral region of the contour so as to not obscure the portions of the contour corresponding to the points ($x_i$, $y_j$, $z_{ij}$) (hereinafter the "data region"). For example, the contour may include a base section on a bottom side thereof that extends outwardly in the manner of a flange parallel to the X-Y plane. The base section does not correspond to any of the points ($x_i$, $y_j$, $z_{ij}$), but rather may be provided as a region in which to include various instances of other information, such as the axis labels, etc. This additional information may be embodied in the shape of the contour itself in the manner of embossing/debossing, or may be embodied as an image on a surface of the contour by means of, for example, using differently colored or shaded material for portions of the contour embodying the information.

In certain exemplary illustrations, the contour may be shaped so as to visibly model information tailored specifically to the customer who requested creation of the 3D print file. For example, an identification unique to the customer (business name, trademark, logo, slogan, identification number, etc.) may be embedded in the contour. This may serve to increase security of the embodied information by identifying those licensed to use the 3D print file and/or the underlying data embodied therein, in addition to personalizing the 3D object and increasing its aesthetic appeal. Such additional information may be obtained independently from the specific request corresponding to the specific contour being created. For example, if the customer is a subscriber to the network 101, the network 101 may have one or more subscriber profiles associated with the customer, and the information about the customer may be obtained, for example, from such a subscriber profile.

In addition, certain features of the contour may be based on other information related to the specific customer, which may be obtained, for example, from one of the subscriber profiles. For example, the subscriber profile may indicate certain category values or category ranges that are of particular interest to the customer. Information regarding such category value/ranges of interest may be gathered by the network 101 operator, for example, upon creation of an account for the subscriber, and may be updated periodically. Then, if the customer requests creation of a 3D print file in which one or more of the category values/ranges of interest corresponds to one or both of the categories selected in the request, then the created contour may automatically highlight portions thereof that correspond to the ranges of interest of the customer. In one illustrative approach, a hypothetical customer may be a business that is interested in strengthening its sales with a certain demographic cross-section—say people aged 20-30 who have an income between $30,000-$40,000. If the hypothetical customer requests a 3D print file with age and income as the selected categories, then the contour may automatically be made so as to highlight the intersection of the range 20-30 along the age axis with the range $30,000-$40,000 on the income axis. Thus, the customer need not necessarily select specific segments for highlighting each time the customer requests a 3D print file, but instead may have regions of interest automatically highlighted whenever such regions appear in any 3D print file that the customer requests. Highlighting may be accomplished, for example, by using a different color or shade for the highlighted region of the contour than for other regions. The information related to the specific customer may also include default values or preferences for 3D objects, which may be automatically applied to any contours created for that particular customer. For example, the customer may designate default color schemes, 3D object sizes, bin sizes, etc.

Further, the contour may be shaped so as to visibly model identification information related to the particular 3D object itself. For example, the contour may visibly model an identification number, which may be used for filing, tracking, or security purposes. The identification number visibly embodied in the contour may be the same as or different from the identification number associated with the customer (describe above) or the identification number included in the metadata of the 3D print file (discussed below).

The contour may also visibly model a scannable code such as a bar code, a two-dimensional Quick Response ("QR") code, micro QR code, or any other type of scannable code. Such codes encode (embed) information in such a manner that, when the code is scanned by an appropriately equipped scanner, the information is decoded and made available to a user thereof. Such a code may encode the identification number discussed above. In addition, such a code may encode additional information, such as a date and/or time on which the 3D print file was created, the settings used in creation of the data points and/or contour (e.g., bin sizes), the individual values of the data points ($x_i$, $y_j$, $z_{ij}$), etc. As an alternative to, or in addition to, directly encoding such specific information, the code may direct the scanner to a website that may provide the information to the customer about the specific 3D print file, such as by encoding a URL to the website.

The contour may be formed so as to include more than one such code. For example, a first code may be provided that encodes information about the 3D object as a whole in the manner discussed above. Such a first code may be provided, for example, in the peripheral region of the contour so as to not obscure the "data region". For example, the first code may be provided on a bottom side of the contour opposite from data region, on the base section discussed above, etc. In addition to the first code, one or more additional codes may be included within the data region. These codes included within the data region may, for example, be provided at points along the surface of the contour corresponding to specific ones of the points ($x_i$, $y_j$, $z_{ij}$), and may encode information related specifically to the data point to which the code corresponds. For example, each of the codes within the data region may encode the numerical values $x_i$, $y_j$, and $z_{ij}$ of the point to which the code corresponds. This is advantageous, for example, because it provides a way for an observer of a 3D object to determine specific values associated with points of the object. In particular, while 3D objects without such codes may be excellent at allowing customers to visualize multidimensional information relationally (i.e., detecting correlations, trends, comparative differences, maxima, minima, etc.), it may be difficult to identify specific values associated with any given point on the object. In other words, a customer may be able to visually detect that a measure value (i.e., a $z_{ij}$ value) of point A is twice as large as that of point B, which is very useful information, but the customer may not be able to visually detect the specific values of point A and point B, which may also be useful information to obtain. While axis labels may help in identifying category values associated with a given point (i.e., the values $x_i$, $y_j$), the value of the measure (i.e., the value of $z_{ij}$) may be more difficult to determine. Contour lines may help in determining measure values, but only to a limited degree of accuracy. Thus, providing the codes within the data region may allow the customer to simply scan a particular point of the 3D object (e.g., using a hand-held scanner, smartphone camera, etc.) and thereby obtain the specific values $x_i$, $y_j$, $z_{ij}$ associated with the given point. Depending upon the size of available codes and the bin sizes of the categories, codes may be provided for each of the data points ($x_i$, $y_j$, $z_{ij}$). However, when the bin size and code size are such that this is not possible (or not desirable), such codes may be provided only for a subset of the data points ($x_i$, $y_j$, $z_{ij}$). For example, codes may be provided for only data points having i and j indexes of i=n, n+c, n+2c, n+3c . . . and j=m, m+d, m+2d, m+3d, . . . , with n, m, c, and d being arbitrary constants. For example, if n=m=1 and c=d=5, then a code is provided every five data points in each direction x and y. Alternatively or in addition, codes may be provided for specific points that have been determined to be points of interest. Examples of such points of interest may include local maxima, local minima, points of abrupt change in gradient (slope), zero-crossings, or points corresponding to the highlighted region discussed above. In addition to the code encoding the values $x_i$, $y_j$, $z_{ij}$ associated with the given point, the code may encode other information associated with that given point, such as one or more gradients at that point along one or more predetermined directions.

The codes included in the data region may also encode additional information derived from the big data set. In other words, at least some of the data points may include a value for a second measure (or even more). For example, if the first and second categories are age and income and the first measure is the number of times a particular word was searched for in an internet search engine, a second measure may be the number of times a particular advertisement was clicked. This allows for the presentation of at least four-dimensional information. While only the first three dimensions of information are readily visualizable by an observer, the inclusion of the fourth-dimension of information by way of code/scanning may be beneficial.

The codes may be embodied within the contour in any way that facilitates their scanning. For example, the code may be embodied in the shape of the contour itself, for example as an embossed/debossed image. The code may also be visible as a two-dimensional image on the surface of the contour, for example by using different color or shading for the portions of the contour corresponding to the image of the code. In circumstances in which it is desired for the codes to not be easily visible (e.g., if they are considered unsightly or distracting), the code may be embodied within the contour in such a way that the code is not easily visible by the human eye but is nonetheless scannable by an appropriate scanner. For example, the material of the contour corresponding to the image of the code may be one that visually appears similar to the surrounding material in normal lighting but that, when appropriately illuminated (e.g., by a UV lamp) becomes visible, or that is visible by the appropriate device (e.g., infrared scanner) but not by the naked eye. However, it may be preferable for at least some small visual indicator associated with the code to remain visible, such that the customer may know where to aim the scanner in order to scan the code.

The contour may be expressible as one or more mathematical functions, as a polygon mesh, as a collection of data points and rules, or in any other suitable format.

In step 509 the contour is converted into a 3D printable format. 3D printers 200 generally print 3D objects based on digital models thereof. The digital models specify a contour in a certain format that the 3D printer 200 understands. Thus, if the contour is not already described in the manner understood by the 3D printer 200, then the contour is converted into such a format. However, it is possible that the contour may already be described in a manner understood by the 3D printer 200, in which case steps 508 and 509 may be combined.

For example, some 3D printers 200 model an object as a polygon mesh. A polygon mesh is a collection of vertices, edges and faces that defines the shape of a polyhedral object. In other words, the polygon mesh describes the exterior surfaces of an object as a combination of many interconnected polygons. The polygons may be sized, shaped, and oriented so as to satisfactorily approximate almost any contour. StereoLithography file format ("STL") and Additive Manufacturing File Format ("AMF") are exemplary file formats for use in 3D printers 200. STL describes a surface of a 3D object by defining a series of triangles, each triangle having three vertices and a facet-normal vector. AMF similarly describes the surface of the 3D object by defining a series of triangles, each triangle having three vertices; however, no facet-normal vector is required. AMF also allows for texture, color, and other information for each triangle, as well as for curved edges of the triangles to better approximate curved surfaces. Various modified STL formats also exist that allow for color and other information to be included. Thus, the 3D print file may include color information as appropriate. For example, when it is desirable that bins be distinguishable from each other (as in the above-described example in which OS is one of the categories), each bin may be assigned a different color to further aid in their being distinguished.

The 3D print file may also include various forms of metadata. For example, an identification number may be provided in the metadata. Such an identification number may be used, for example, for proof of authentication and uniqueness of the printout. For example, the metadata may include: (1) a numeric value equal to the sum of the highest Z axis point, highest Y axis point, and highest X axis point of the contour, (2) a numeric value equal to the surface area of the contour, (3) a numeric value equal to the volume of the contour, (4) a date and time of the print request, and/or (5) a network identifier tag that uniquely identifies the machine of the network 101 that processed the print request. The 3D printer 200 may be configured to only accept a 3D print file whose metadata matches the 3D object to be printed. For example, if the volume of the object to be printed does not match the volume specified in the metadata, it can be assumed that the file has been changed, and thus the 3D printer 200 may refuse to print from the file. Similarly, if the network identifier tag does not match one of a list of approved network identifier tags, the 3D printer 200 may not accept the file. Thus, the metadata may ensure only authentic files and files that have not been tampered with are printable.

In step 510 a file containing the 3D printable formatted contour may be outputted. As discussed above with respect to FIGS. 3A-4B, the file may be encrypted and may be transferred to the printer 200 in various ways. A 3D object may be printed from the file that allows for visualization of the complex information derived from the subscriber data.

As discussed above, the data visualizer platform 105 may provide an interface by which the customer may submit the request. The interface 105 may present the customer with options for selecting the first and second categories, the measure, and the constraints. The interface 105 may also provide the customer with options for selecting various settings, such as bin sizes, color options, etc. The interface 105 may be in the form of a webpage accessible by the customer 105. The webpage may be accessible only by communication over the network 101 in certain illustrations. In other illustrations, the webpage may be accessible by communication over external networks such as the internet. Alternatively, the user interface may be provided in the printer 200 itself or in one of the customer's subscriber devices 104. For example, an application may be installed in the printer 200 that provides the interface, and the application may communicate the customer's selections to the data visualizer platform 105. The interface may present as options for selection as the first and second category all of or a subset of the types of variable that are included in the subscriber data. The interface may present as options for selection as a measure all of or a subset of the types of variable that are included in the subscriber data, as well as types of values derivable therefrom, such as averages, sums, densities, rates of changes, etc. The interface may be configured to limit the types of measures that are selectable by the customer based on the customer's selection of the first and second categories. For example, the interface may be configured to limit the types of measure to those that have a causal relationship to the first and second variables.

As noted above, those persons who may be interested in the information derivable from a big data set may not have ready access to such data, the computing power and data processing tools that would be necessary to analyze such a big data set, or the computing power or technologies that would be necessary for creating 3D print files for 3D objects embodying such information. Thus, providing the data visualizer platform 105 and the user interface may allow for such persons to obtain a 3D object embodying information derived from the big data set without themselves having to gather the data and process the data to derive information therefrom and produce a 3D printable model based thereon. In addition, by providing the data visualization service to customers of the network 101 over the network 101, the data and the information derived therefrom may be kept "in network", thereby increasing security.

In general, computing systems and/or devices, such as the data visualizer platform 105, may employ any of a number of computer operating systems, including, but by no means limited to, versions and/or varieties of the Microsoft Windows® operating system, the Unix operating system (e.g., the Solaris® operating system distributed by Oracle Corporation of Redwood Shores, Calif.), the AIX UNIX operating system distributed by International Business Machines of Armonk, N.Y., the Linux operating system, the Mac OS X and iOS operating systems distributed by Apple Inc. of Cupertino, Calif., the BlackBerry OS distributed by Research In Motion of Waterloo, Canada, and the Android operating system developed by the Open Handset Alliance. Examples of computing devices include, without limitation, a computer workstation, a server, a desktop, notebook, laptop, or handheld computer, or some other computing system and/or device.

Computing systems and/or devices, such as the data visualizer platform 105, generally include computer-executable instructions, where the instructions may be executable by one or more computing devices. Computer-executable instructions may be compiled or interpreted from computer programs created using a variety of programming languages and/or technologies, including, without limitation, and either alone or in combination, Java™, C, C++, Visual Basic, Java Script, Perl, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random access memory (DRAM), which typically constitutes a main memory. Such instructions may be transmitted by one or more transmission media, including coaxial cables, copper wire and fiber optics, including the wires that comprise a system bus coupled to a processor of a computer. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

In general, a network (e.g., network 101) may be a collection of computers and other hardware to provide infrastructure to establish virtual connections and carry communications. For instance, a network may be an infrastructure that generally includes edge, distribution, and core devices and enables a path for the exchange of information between different devices and systems (e.g., between the subscriber devices 104 and the data visualizer platform 105).

Further, a network may be any conventional networking technology, and may, in general, be any packet network (e.g., any of a cellular network, global area network, wireless local area networks, wide area networks, local area networks, or combinations thereof, but may not be limited thereto) that provides the protocol infrastructure to carry communications. The network 101 is representative, and thus while a single cloud illustrates the network 101, this illustration may represent a single network, a combination of different networks components and technologies, and/or a plurality of networks, as described above.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description or Abstract below, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their broadest reasonable constructions and their ordinary meanings as understood by those knowledgeable in the technologies described herein unless an explicit indication to the contrary in made herein. In particular, use of the singular articles such as "a," "the," "said," etc. should be read to recite one or more of the indicated elements unless a claim recites an explicit limitation to the contrary.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

The invention claimed is:

1. A method, comprising:
   gathering subscriber information about subscribers of a network via a computing device;
   receiving at the computing device a user request of a user;
   generating object-data specifying a three-dimensional ("3D") contour via the computing device, based on the received request and on the subscriber information, in a format that is printable by a 3D printer, the 3D contour modeling a relationship between at least two variables of the subscriber information and a measure;
   provisioning to the user a 3D printer that is configured to connect to the network; and
   encrypting the object-data such that only the 3D printer may decrypt the object-data,
   transmitting the object-data to the user via the computing device.

2. The method of claim 1, wherein the request is received over the network without traversing an external network.

3. The method of claim 2, wherein the object-data is transmitted to the user over the network without traversing an external network.

4. The method of claim 1, wherein the object-data is transmitted over the network to the 3D printer.

5. The method of claim 1, wherein the user request designates a first variable included in the subscriber information, a second variable included in the subscriber information, and the measure, and
   the method further comprises:
      accessing entries of the subscriber information via the computing device,
      sorting the accessed entries on the basis of the first variable into first data slices via the computing device,
      sorting the first data slices on the basis of the second variable into second data slices via the computing device,
      determining a value of the measure for each second data slice via the computing device, and
      generating a coordinate point for each second data slice based on the determined value of the measure via the computing device, the 3D contour corresponding to the generated coordinate points.

6. The method of claim 1, further comprising:
   providing a user-interface for receiving the request via the computing device, the user-interface providing the user options to select at least a first variable included in the subscriber information, a second variable included in the subscriber information, and the measure.

7. The method of claim 1, wherein the user-interface is accessible only via a device connected to the network.

8. A system comprising:
   a network to which subscribers are connected;
   a data visualization platform connected to the network, where the data visualization platform is configured to gather subscriber information about the subscribers of the network;
   receive a user request of a user;
   generate object-data specifying a three-dimensional ("3D") contour, based on the received request and on the subscriber information, in a format that is printable by a 3D printer, the 3D contour modeling a relationship between at least two variables of the subscriber information and a measure; and
   transmit the object-data to the user;
   wherein the 3D printer is configured to connect to the network, and the object-data is encrypted such that only the 3D printer may decrypt the object-data.

9. The system of claim 8, wherein the request is received over the network without traversing an external network.

10. The system of claim 9, wherein the object-data is transmitted to the user over the network without traversing an external network.

11. The system of claim 8, wherein object-data is transmitted over the network to the 3D printer.

12. The system of claim 8,
wherein the user request designates a first variable included in the subscriber information, a second variable included in the subscriber information, and the measure, and
the data visualization platform is further configured to:
access entries of the subscriber information,
sort the accessed entries on the basis of the first variable into first data slices,
sort the first data slices on the basis of the second variable into second data slices,
determine a value of the measure for each second data slice, and
generate a coordinate point for each second data slice based on the determined value of the measure, the 3D contour corresponding to the generated coordinate points.

13. The system of claim 8, wherein the data visualization platform is configured to provide a user-interface for receiving the request, the user-interface providing the user options to select at least a first variable included in the subscriber information, a second variable included in the subscriber information, and the measure.

14. The system of claim 8, wherein the user-interface is accessible only via a device connected to the network.

15. A non-transitory computer readable medium having program code stored thereon, the program code being executable by a computer and being configured to, when executed by the processor, cause the computer to perform operations comprising:
gathering subscriber information about subscribers of a network;
receiving a user request of a user;
generating object-data specifying a three-dimensional ("3D") contour, based on the received request and on the subscriber information, in a format that is printable by a 3D printer, the 3D contour modeling a relationship between at least two variables of the subscriber information and a measure;
provisioning the 3D printer that is configured to connect to the network;
encrypting the object-data such that only the 3D printer may decrypt the object-data; and
transmitting the object-data to the user.

16. The non-transitory computer readable medium of claim 15, wherein the request is received over the network without traversing an external network.

17. The non-transitory computer readable medium of claim 16, wherein the object-data is transmitted to the user over the network without traversing an external network.

18. The non-transitory computer readable medium of claim 15, wherein the object-data is transmitted over the network to the 3D printer.

19. The non-transitory computer readable medium of claim 15,
wherein the user request designates a first variable included in the subscriber information, a second variable included in the subscriber information, and the measure, and
the operations further comprise:
accessing entries of the subscriber information,
sorting the accessed entries on the basis of the first variable into first data slices,
sorting the first data slices on the basis of the second variable into second data slices,
determining a value of the measure for each second data slice, and
generating a coordinate point for each second data slice based on the determined value of the measure, the 3D contour corresponding to the generated coordinate points.

20. The non-transitory computer readable medium of claim 15, wherein the operations further comprise providing a user-interface for receiving the request, the user-interface providing the user options to select at least a first variable included in the subscriber information, a second variable included in the subscriber information, and the measure.

* * * * *